United States Patent
Jette

(10) Patent No.: US 11,929,602 B2
(45) Date of Patent: Mar. 12, 2024

(54) CABLE CONVEYANCE SYSTEMS INCORPORATING ELECTRONIC VISUAL DISPLAYS

(71) Applicant: Cable Management Solutions Inc., Bayshore, NY (US)

(72) Inventor: Roger Jette, East Islip, NY (US)

(73) Assignee: CABLE MANAGEMENT SOLUTIONS INC., Bayshore, NY (US)

(*) Notice: Subject to any disclaimer, the term of this patent is extended or adjusted under 35 U.S.C. 154(b) by 733 days.

(21) Appl. No.: 17/074,747

(22) Filed: Oct. 20, 2020

(65) Prior Publication Data
US 2021/0126445 A1   Apr. 29, 2021

Related U.S. Application Data

(60) Provisional application No. 62/924,902, filed on Oct. 23, 2019.

(51) Int. Cl.
*H02G 7/20*    (2006.01)
*G09F 7/18*    (2006.01)

(52) U.S. Cl.
CPC ............... *H02G 7/20* (2013.01); *G09F 7/18* (2013.01); *G09F 2007/1839* (2013.01)

(58) Field of Classification Search
None
See application file for complete search history.

(56) References Cited

U.S. PATENT DOCUMENTS

| | | | |
|---|---|---|---|
| 5,593,049 A | * | 1/1997 | Farham ............... H02G 3/288 211/1 |
| 5,893,539 A | | 4/1999 | Tran et al. |
| 5,957,416 A | | 9/1999 | Sellati |
| 6,364,255 B1 | | 4/2002 | Carrick et al. |

(Continued)

FOREIGN PATENT DOCUMENTS

| AT | 13695 U1 * | 4/2014 | ............ A47B 97/02 |
|---|---|---|---|
| CA | 2975935 A1 * | 2/2018 | ........ G02F 1/133308 |

(Continued)

OTHER PUBLICATIONS

European Office Action issued in EP Application No. 20203014, dated May 23, 2023, pp. 1-7.

(Continued)

*Primary Examiner* — Timothy J. Dole
*Assistant Examiner* — Muhammed Azam
(74) *Attorney, Agent, or Firm* — CARTER, DELUCA & FARRELL LLP

(57) ABSTRACT

A cable conveyance system includes first and second rails, a plurality of cable-retaining supports, and at least one front panel including one or more electronic visual displays. The plurality of cable-retaining supports are disposed between the first and second rails in parallel, spaced apart relation relative to one another and the first and second rails to define a plurality of spaced apart and parallel longitudinal cable-receiving passages each configured to retain at least one longitudinally-extending cable therein. The at least one front panel is pivotable relative to the first and second rails between an open position and a closed position.

10 Claims, 3 Drawing Sheets

(56) References Cited

U.S. PATENT DOCUMENTS

| | | | | |
|---|---|---|---|---|
| 6,729,054 | B1* | 5/2004 | VanderTuin | G09F 9/30 16/236 |
| 6,741,222 | B1* | 5/2004 | Tucker | G09F 9/33 345/1.1 |
| 7,245,279 | B2* | 7/2007 | Wang | G09F 9/33 345/55 |
| 7,284,881 | B2* | 10/2007 | Kim | G09F 9/33 362/800 |
| 7,874,861 | B2* | 1/2011 | Wang | H05K 3/0097 439/325 |
| 7,948,450 | B2* | 5/2011 | Kay | G06F 3/147 345/1.3 |
| 8,042,698 | B2* | 10/2011 | Kim | F16M 13/02 211/78 |
| 8,783,628 | B2 | 7/2014 | Jette | |
| 8,985,530 | B2 | 3/2015 | Jette | |
| 9,069,519 | B1* | 6/2015 | Hall | G06F 1/20 |
| 9,326,620 | B1* | 5/2016 | Cross | G09F 9/3026 |
| 9,812,044 | B1* | 11/2017 | Yousef | G09F 21/04 |
| 10,237,993 | B1* | 3/2019 | Gaietto | H05K 5/0204 |
| 10,778,962 | B2* | 9/2020 | Ng | H04N 13/307 |
| 2001/0007341 | A1 | 7/2001 | Jette | |
| 2003/0117063 | A1* | 6/2003 | Tajima | G09F 7/18 445/24 |
| 2005/0210722 | A1* | 9/2005 | Graef | G09F 9/3026 345/82 |
| 2006/0218828 | A1 | 10/2006 | Schrimpf et al. | |
| 2007/0000849 | A1* | 1/2007 | Lutz | G09F 9/33 211/26 |
| 2007/0001927 | A1* | 1/2007 | Ricks | G09F 9/3026 345/1.1 |
| 2007/0218751 | A1* | 9/2007 | Ward | G09F 9/3026 439/404 |
| 2008/0104895 | A1 | 5/2008 | Deweerd et al. | |
| 2008/0236045 | A1 | 10/2008 | DeBlonk et al. | |
| 2008/0250613 | A1* | 10/2008 | Franklin | G09F 15/0025 24/459 |
| 2009/0038124 | A1* | 2/2009 | Franklin | F16B 2/14 24/459 |
| 2009/0146919 | A1* | 6/2009 | Kline | G09G 3/32 345/46 |
| 2009/0229085 | A1* | 9/2009 | Franklin | G09F 15/0025 24/115 M |
| 2009/0309871 | A1* | 12/2009 | Elliott | F21S 2/005 345/214 |
| 2010/0037533 | A1* | 2/2010 | Anderson | G09F 7/18 52/39 |
| 2011/0173853 | A1* | 7/2011 | Leveque | F03D 9/34 290/55 |
| 2011/0181494 | A1* | 7/2011 | Wong | G09F 9/33 345/1.3 |
| 2012/0175470 | A1 | 7/2012 | Jette | |
| 2013/0181884 | A1* | 7/2013 | Perkins | G09F 9/3026 345/1.3 |
| 2016/0014882 | A1* | 1/2016 | Jongman | G02F 1/13452 156/247 |
| 2016/0224306 | A1* | 8/2016 | Rycyna, III | G09G 3/32 |
| 2016/0232822 | A1* | 8/2016 | Ward | H04N 5/63 |
| 2017/0031386 | A1* | 2/2017 | Engel | F16M 11/42 |
| 2019/0289756 | A1* | 9/2019 | Lee | G09F 15/005 |
| 2020/0245488 | A1* | 7/2020 | Iacovoni | H05K 5/0017 |

FOREIGN PATENT DOCUMENTS

| | | | | |
|---|---|---|---|---|
| CA | 3096633 A1 | * | 4/2021 | G09F 7/18 |
| CN | 202736420 U | * | 2/2013 | G09F 9/3026 |
| CN | 111681571 A | * | 9/2020 | |
| DE | 10106402 A1 | * | 8/2002 | G09F 7/18 |
| DE | 20313391 U1 | * | 1/2004 | G09F 15/0037 |
| DE | 202010008118 U1 | * | 1/2012 | G09F 15/0025 |
| EP | 1070894 A2 | | 1/2001 | |
| EP | 1225556 A2 | * | 7/2002 | G09F 15/00 |
| EP | 1339036 A2 | * | 8/2003 | G09F 9/33 |
| EP | 2919223 A1 | * | 9/2015 | F16M 11/00 |
| FR | 2854273 A1 | * | 10/2004 | B66D 1/12 |
| FR | 2919746 A1 | * | 2/2009 | G09F 17/00 |
| GB | 2467799 A | * | 8/2010 | G09F 9/33 |
| GB | 2539865 A | * | 1/2017 | F16L 3/00 |
| GB | 2545174 A | * | 6/2017 | G09F 9/301 |
| KR | 200141026 Y1 | * | 5/1999 | |
| KR | 20000054176 A | * | 9/2000 | |
| KR | 20090002811 A | * | 1/2009 | |
| KR | 20100138306 A | * | 12/2010 | |
| KR | 101144188 B1 | * | 5/2012 | |
| KR | 20130088683 A | * | 8/2013 | |
| KR | 20190122151 A | * | 10/2019 | |
| WO | WO-0021418 A2 | * | 4/2000 | A47F 7/143 |
| WO | WO-2008055328 A1 | * | 5/2008 | G09F 11/18 |
| WO | WO-2008129232 A1 | * | 10/2008 | G09F 15/0025 |
| WO | WO-2010063903 A1 | * | 6/2010 | G09F 11/21 |
| WO | WO-2014153271 A2 | * | 9/2014 | G09F 9/3026 |
| WO | WO-2015017872 A2 | * | 2/2015 | A47B 83/001 |
| WO | 2019/034786 A1 | | 2/2019 | |

OTHER PUBLICATIONS

European Search Report and Written Opinion issued in corresponding Applcation No. 18169313 dated Sep. 12, 2018, 6 pages.

European Search Report and Written Opinion issued in EP Application No. 20 20 3014, dated Apr. 12, 2021, pp. 1-7.

* cited by examiner

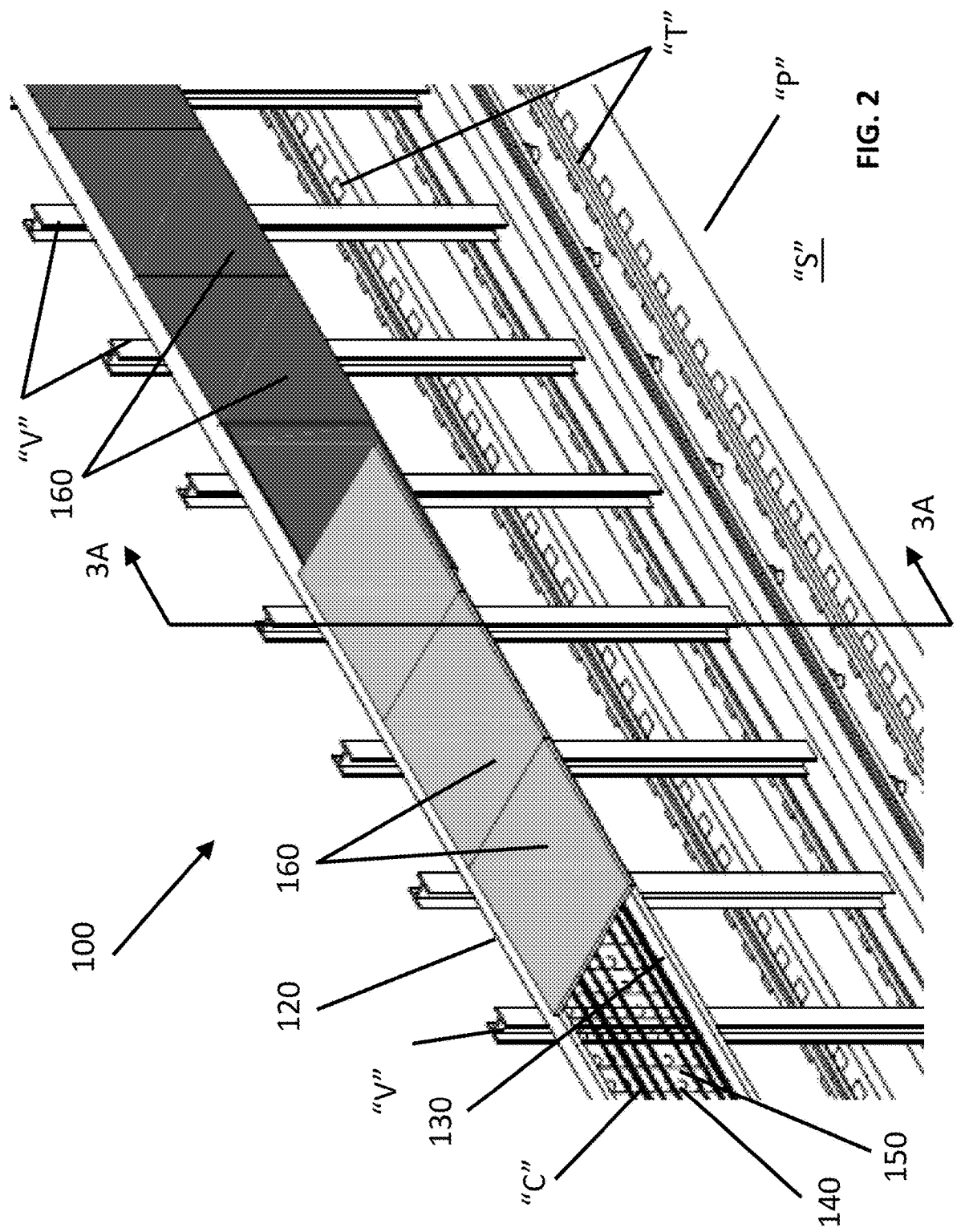

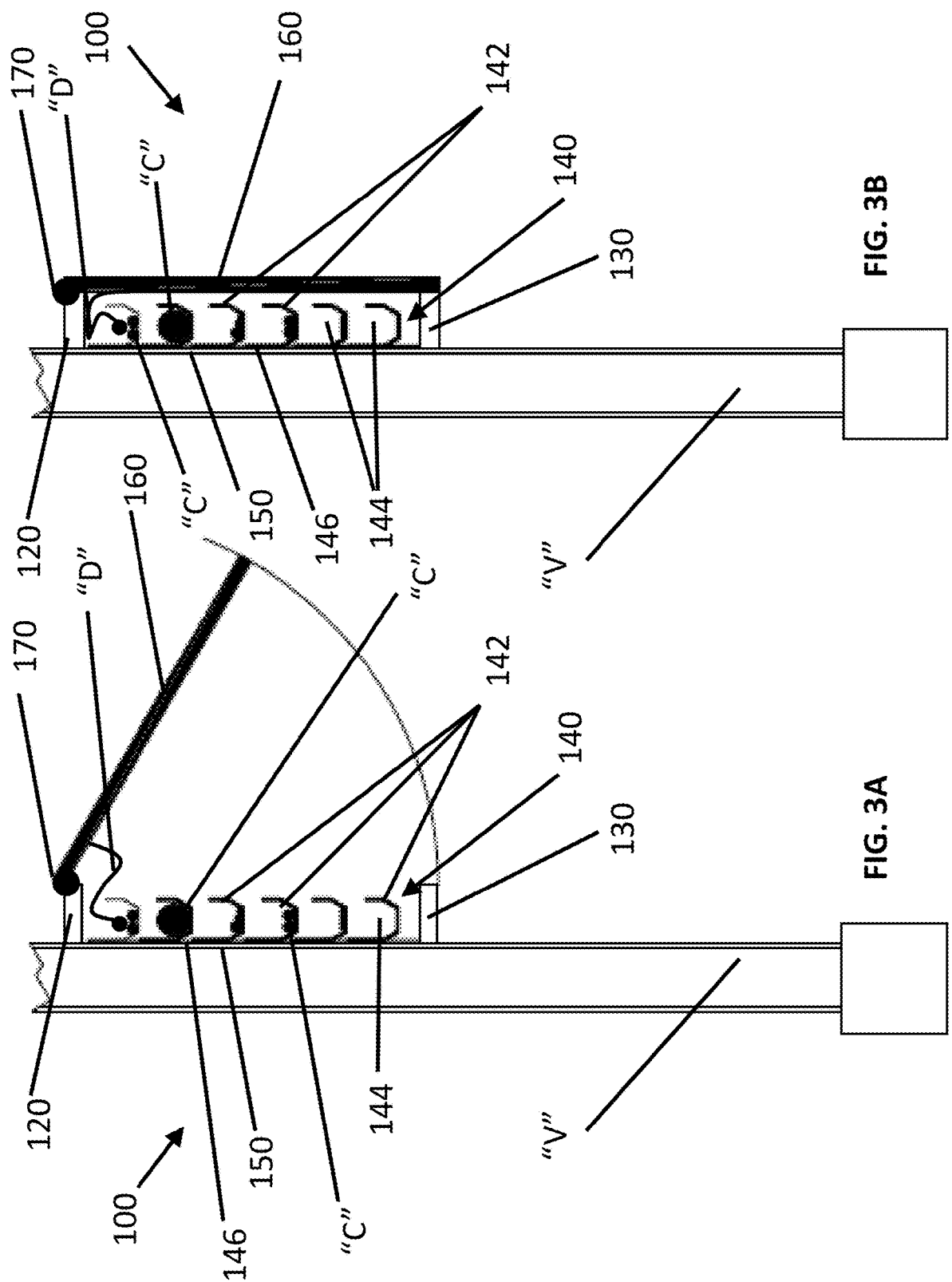

CABLE CONVEYANCE SYSTEMS INCORPORATING ELECTRONIC VISUAL DISPLAYS

CROSS-REFERENCE TO RELATED APPLICATIONS

This application claims the benefit of and priority to U.S. Provisional Patent Application No. 62/924,902, filed on Oct. 23, 2019, the entire contents of which are hereby incorporated herein by reference.

BACKGROUND

Technical Field

The present disclosure relates to cable conveyance. More particularly, the present disclosure relates to cable conveyance systems incorporating electronic visual displays to utilize cable conveyance structures for the display of relevant information, advertisements, etc.

Background of Related Art

Cable conveyance of power, communication, data and/or other cabling is utilized in almost all modern infrastructure including office and industrial buildings, transportation structures such as railways and subways, stadiums and other entertainment venues, etc.

In some instances, whether by choice, out of convenience, or out of necessity, cables extend through open areas thereby rendering the cables and/or cable conveyance structures supporting the cables visible to the public, customers, visitors, occupants, etc.

SUMMARY

Provided in accordance with the present disclosure are cable conveyance systems incorporating electronic visual displays. In the manner, cable conveyance structures visible to the public, customers, visitors, occupants, etc., can be utilized for the display of relevant information, advertisements, etc. For example, the electronic visual displays of cable conveyance structures extending through a subway station may be utilized to display train information, updates and alerts, advertisements, public service announcements, etc. The above and other aspects and features of the present disclosure are detailed below. To the extent consistent, any of the aspects and features detailed herein may be utilized with any or all of the other aspects and features detailed herein.

In accordance with aspects of the present disclosure, a cable conveyance system is provided including first and second rails extending longitudinally in spaced-apart relation relative to one another, a plurality of cable-retaining supports disposed between the first and second rails, and at least one front panel including an electronic visual display. Each cable-retaining support is configured to retain at least one longitudinally-extending cable therein. The at least one front panel is hingedly coupled to the first rail such that the at least one first panel is pivotable relative to the first and second rails between an open position, providing access to the plurality of cable-retaining supports, and a closed position, at least partially enclosing the plurality of cable-retaining supports between the first and second rails and the at least one front panel.

In aspects of the present disclosure, the cable conveyance system further includes a back panel extending between the first and second rails and longitudinally therealong. The plurality of cable-retaining supports are disposed on the back panel.

In aspects of the present disclosure, the first and second rails extend generally perpendicularly from the back panel and, in the closed position, the at least one front panel extends generally parallel to the back panel to define a rectangular cross-sectioned enclosure.

In aspects of the present disclosure, the at least one front panel includes a plurality of front panels each including an electronic visual display. Each front panel may independently pivot relative to the other front panels of the plurality of front panels. Additionally or alternatively, the electronic visual displays of the front panels may be configured to cooperate to define an elongate display and/or may be configured as independent displays.

In aspects of the present disclosure, the plurality of cable-retaining supports includes at least one elongated spine including a plurality of support members depending therefrom to define a longitudinal cable-receiving passage. In such aspects, the at least one elongated spine and the plurality of support members are each formed from wire stock.

In aspects of the present disclosure, the first and second rails are upper and lower rails, respectively.

BRIEF DESCRIPTION OF THE DRAWINGS

Various aspects and features of the present disclosure are described hereinbelow with reference to the drawing figures, wherein:

FIG. 2 is an enlarged, perspective view of the area of detail identified as "2" in FIG. 1;

FIG. 3A is a transverse, cross-sectional view taken across section line "3A-3A" of FIG. 2, wherein a front panel of the cable conveyance system is disposed in an open position; and FIG. 3B is a transverse, cross-sectional view as illustrated in FIG. 3A, wherein the front panel of the cable conveyance system is disposed in a closed position.

DETAILED DESCRIPTION

Figure 1:
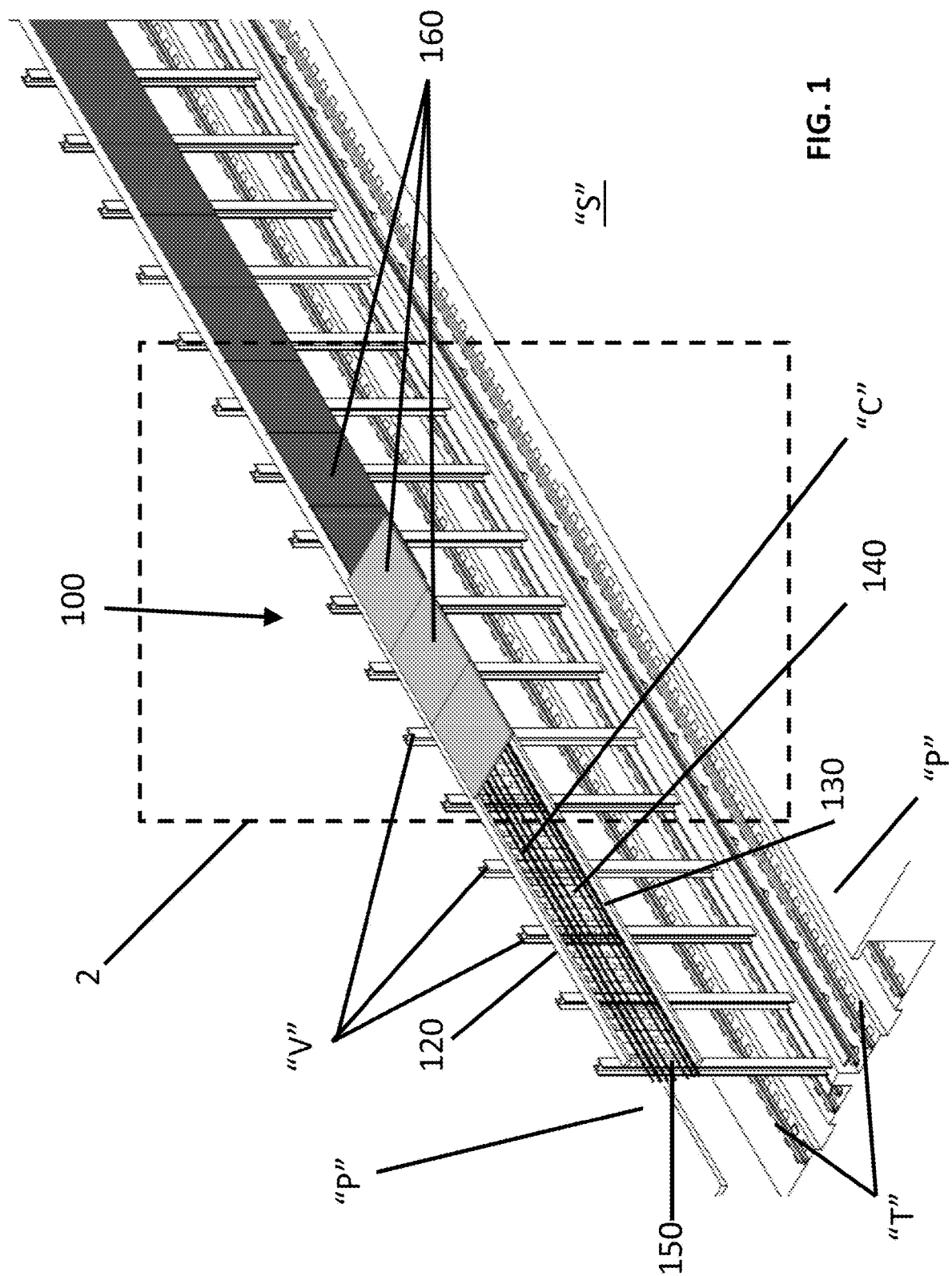
FIG. 1 is a perspective view of a cable conveyance system provided in accordance with the present disclosure shown extending through a subway station.

Referring generally to FIGS. 1-3B, a cable conveyance system provided in accordance with the present disclosure is shown generally identified by reference numeral 100. Although detailed and illustrated herein extending through a subway station "S" and supported on vertical beams "V" arranged between different sets of train tracks "T," cable conveyance system 100 is equally applicable for use in other industries and/or for support from different support structures. Further, while one cable conveyance system 100 is shown oriented towards one platform "P" serving one set of train tracks "T" of the subway station "S," it is contemplated that a second cable conveyance system 100 may be provided on the opposite side, e.g., oriented towards the other platform "P" serving the other set of train tracks "T" of the subway station "S."

Cable conveyance system 100 includes one or more upper rails 120, one or more lower rails 130, and one or more cable-retaining supports 140. The one or more upper rails 120 are arranged end-to-end so as to collectively define an elongated upper rail 120. As such, the one or more upper rails 120 will be referred to in the singular with the understanding that the upper rail 120 may include plural upper rails 120. Likewise, the one or more lower rails 130 are arranged end-to-end so as to collectively define an elongated lower rail 130. As such, the one or more lower rails 130 will be referred to in the singular with the understanding that the lower rail 130 may include plural lower rails 130.

In embodiments, cable conveyance system 100 further includes one or more back supports 150 extending between and interconnecting upper and lower rails 120, 130. The one or more back supports 150 are arranged end-to-end so as to collectively define an elongated back support. As such, the one or more back supports 150 will be referred to in the singular with the understanding that the back support 150 may include plural back supports 150.

Upper and lower rails 120, 130 are oriented substantially perpendicular (e.g., within 15° of perpendicular) relative to back support 150 such that upper and lower rails 120, 130 extend outwardly from back support 150. Back support 150 may be configured as a solid panel, a mesh or otherwise partially-open panel, an arrangement of vertical and/or horizontal bars, or other suitable configuration. In other embodiments, back support 150 is omitted. Back support 150 may be attached to vertical beams "V," e.g., via bolts, to support cable conveyance system 100 therefrom. Alternatively or additionally, upper and/or lower rails 120, 130 may be attached to vertical beams "V," e.g., via bolts, to support cable conveyance system 100 therefrom. As an alternative to support via vertical beams "V," cable conveyance system 100 may be supported on one or more horizontal surfaces, may be engaged with one or more horizontal structures, may depend from one or more overhead structures, or may be supported in any other suitable configuration including combinations of the above or other configurations.

Cable-retaining supports 140 may be integrally formed with or otherwise attached to back support 150, e.g., via welding, bolts, etc. In embodiments where back support 150 is omitted, cable-retaining supports 140 may also serve to interconnect upper and lower rails 120, 130, although cable-retaining supports 140 may alternatively be independent of upper and/or lower rails 120, 130. Plural cable-retaining supports 140 may be arranged in end-to end fashion to define an elongated cable-retaining support. Alternatively or additionally, cable-retaining supports 140 may be arranged in one or more vertically-spaced, horizontally-extending rows (see FIGS. 3A and 3B).

Cable-retaining supports 140 may include one or more pluralities of individual support members 142 wherein the individual support members 142 of each plurality of support members 142 are arranged to define a longitudinally-extending passageway 144 therethrough. Alternatively or additionally, one or more of the cable-retaining supports 140 may include a plurality of support members 142 spaced-apart along and connected to a flexible spine 146. Support members 142 and/or flexible spines 146, in any of the above-embodiments, may be formed from wire stock and/or may be welded to one another. Support members 142 may be configured to define suitable curvature, angles, etc. such that longitudinally-extending passageways 144 define any suitable cross-sectional configuration, e.g., circular, oval, polygonal, irregular, etc., and may be configured to define multiple areas within longitudinally-extending passageways 144 to enable separation of some cables "C" from other cables "C." Flexible spines 146 may be configured to bend off of a longitudinal axis thereof to enable routing above, below, or around obstacles or for other purposes.

In embodiments, as an alternative or in addition to individual support member 142, e.g., formed from wire stock, cable-retaining supports 140 may include one or more longitudinally-extending support troughs (not shown) or other suitable cable-supporting structures. Regardless of the particular configuration, cable-retaining supports 140 are configured to retain a plurality of cables "C" therein, thus enabling longitudinal conveyance of cables "C" along cable conveyance system 100. Further, cable-retaining supports 140 extend outwardly from back support 150 to define a depth dimension that is less than a depth dimension of upper and lower rails 120, 130. That is, upper and lower rails 120, 130 protrude further outwardly from back support 150 as compared to cable-retaining supports 140. In embodiments, cable-retaining supports 140 may be mounted on back support 150, e.g., via bolts, and/or may be attached to vertical beams "V," e.g., via bolts.

Cable conveyance system 100 further includes one or more front panels 160 including an electronic visual display. The one or more front panels 160 are arranged end-to-end so as to collectively define an elongated front panel. Each electronic visual display may be, e.g., an electroluminescent display (ELD), a liquid crystal display (LCD), a light-emitting diode (LED) display, an organic light-emitting diode (OLED) display, a plasma display (PD), or other suitable electronic visual display. The electronic visual displays, in embodiments where plural front panels 160 are provided, may be configured to operate independently of one another as separate displays, and/or may be configured to operate collectively with one or more other, e.g., adjacent, displays to define an extended display.

In some embodiments of cable conveyance system 100, one or more electronic visual display front panels 160 are provided in addition to one or more standard front panels 160, e.g., panels formed from a sheet or other piece(s) of material. Alternatively or additionally, a portion or portions of cable conveyance system 100 may omit front panels 160.

With particular reference to FIGS. 3A and 3B, each front panel 160 is coupled to upper rail 120 via one or more hinges 170 to enable the front panel 160 to pivot between an open position (FIG. 3A), wherein the front panel 160 is disposed at an angle relative to back panel 150 and cable-retaining supports 140 are at least partially exposed, and a closed position (FIG. 3B), wherein the front panel 160 is disposed in substantially parallel (e.g., within 15° of parallel) orientation relative to back panel 150 to define an enclosure with back panel 150, upper rail 120, and lower rail 130 that encloses cable-retaining supports 140 therein. Alternatively or additionally, one or more front panels 160 may be hingedly engaged to lower rail 130 and/or one or more front panels 160 may be fixedly engaged to upper rail 120 and/or lower rail 130. In embodiments, releasable locking structure(s) may be provide to enable releasable locking of front panel(s) 160 with lower rail 130 in the closed position. Allowing front panels 160 to pivot about hinges 170 between the open position and the closed position allows for access to cable-retaining supports 140, e.g., to lay, remove, and/or rearrange cables "C."

Due to the fact that upper and lower rails 120, 130 protrude further outwardly from back support 150 as compared to cable-retaining supports 140, front panels 160, in the closed position (FIG. 3B), do not interfere with cable-retaining supports 140 or the cables "C" conveyed therealong. Rather, front panels 160 close and form the enclosure retaining cable-retaining supports 140 and cables "C" therein. Further, display cabling "D" connected to the electronic visual display front panels 160 may be routed into one of the cable-retaining supports 140 for conveyance at least partially along cable conveyance system 100, e.g., to a power supply, router, computer, other communication device, etc., for powering, controlling, and/or communicating with electronic visual display front panels 160.

Referring again to FIGS. 1-3B, electronic visual display front panels 160 may be configured to display, for example, textual information, still graphics, animated graphics, video, combinations thereof, etc. With respect to implementation in subway station "S," for example, the textual information may include train status information, changes, alerts, warnings, updates, etc. The graphics and video may include public service announcements, advertisements, notifications, etc. Depending on the desired configuration, one or more electronic visual display front panels 160 may be independent of or work in cooperation with one or more other electronic visual display front panels 160 such that, for example, a portion or portions of cable conveyance system 100 may display train status information across one or more other electronic visual display front panels 160 and another portion or portions of cable conveyance system 100 may display advertisements, public service announcements, etc.

Regardless of the particular information provided via electronic visual display front panels 160, by positioning cable conveyance system 100 in a suitable position, e.g., supported on vertical beams "V" arranged between different sets of train tracks "T" and facing a platform "P" in a subway station "S," cable conveyance system 100 becomes a desirable, information-providing utility in addition to its use to convey and conceal cable-retaining supports 140 and cables "C." That is, rather than attempting to hide cables "C" and/or cable conveyance system 100 from view, cable conveyance system 100 is prominently positioned to provide visual information, e.g., advertisements, status information, weather, news, updates, alerts, notifications, etc., in an attractive and useful manner.

Portions of cable conveyance system 100 not visible, e.g., portions within subway tunnels, on the other hand, may include standard front panels 160, no front panels 160, or may exclude enclosures altogether, e.g., wherein just cable-retaining supports 140 (or other cable-conveying structures) are provided for conveying cables "C.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A cable conveyance system, comprising:
   first and second rails extending longitudinally in spaced-apart relation relative to one another;
   a plurality of cable-retaining supports disposed between the first and second rails in parallel, spaced apart relation relative to one another and the first and second rails to define a plurality of spaced apart and parallel longitudinal cable-receiving passages, each longitudinal cable-receiving passage configured to retain at least one longitudinally-extending cable therein; and
   at least one front panel including an electronic visual display, wherein the at least one front panel is hingedly coupled to the first rail such that the at least one first panel is pivotable relative to the first and second rails between an open position, providing access to the plurality of cable-retaining supports, and a closed position, at least partially enclosing the plurality of cable-retaining supports between the first and second rails and the at least one front panel.

2. The cable conveyance system according to claim 1, further comprising a back panel extending between the first and second rails and longitudinally therealong, wherein the plurality of cable-retaining supports are disposed on the back panel.

3. The cable conveyance system according to claim 2, wherein the first and second rails extend generally perpendicularly from the back panel and wherein, in the closed position, the at least one front panel extends generally parallel to the back panel to define a rectangular cross-sectioned enclosure.

4. The cable conveyance system according to claim 1, wherein the at least one front panel includes a plurality of front panels each including an electronic visual display.

5. The cable conveyance system according to claim 4, wherein each front panel of the plurality of front panels is independently pivotable relative to other front panels of the plurality of front panels.

6. The cable conveyance system according to claim 4, wherein the electronic visual displays of the plurality of front panels are configured to cooperate to define an elongate display.

7. The cable conveyance system according to claim 4, wherein the electronic visual displays of the plurality of front panels are configured as independent displays.

8. The cable conveyance system according to claim 1, wherein the plurality of cable-retaining supports includes at least one elongated spine and wherein at least one cable-retaining support of the plurality of cable-retaining supports includes a plurality of support members depending from the at least one elongated spine to define the longitudinal cable-receiving passage thereof.

9. The cable conveyance system according to claim 8, wherein the at least one elongated spine and the plurality of support members are each formed from wire stock.

10. The cable conveyance system according to claim 1, wherein the first and second rails are upper and lower rails, respectively.

* * * * *